Jan. 21, 1958 D. T. PHILIPPAR 2,820,291
TOOL AND SHEATHING HANDLE THEREFOR
Filed Oct. 9, 1953
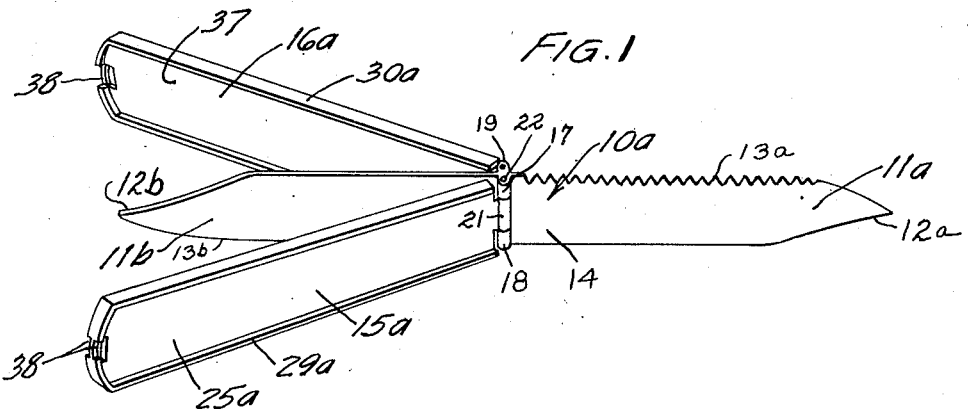
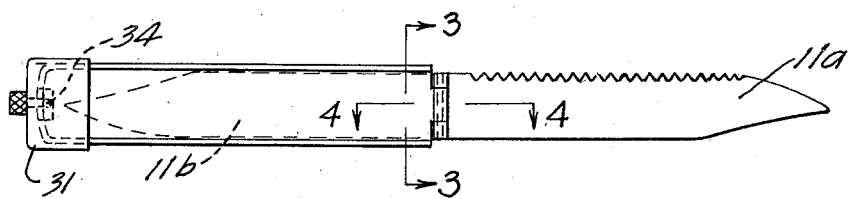
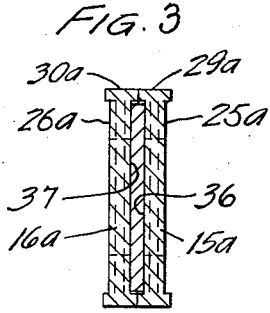
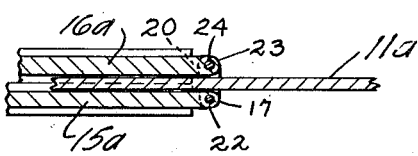
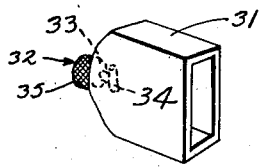
INVENTOR
DONALD T. PHILIPPAR
BY Williamson, Williamson, Schroeder & Adams
ATTORNEYS

United States Patent Office 2,820,291
Patented Jan. 21, 1958

2,820,291
TOOL AND SHEATHING HANDLE THEREFOR

Donald T. Philippar, Sturgis, S. Dak.

Application October 9, 1953, Serial No. 385,104

2 Claims. (Cl. 30—153)

This invention relates to tools having foldable handles and more particularly to such tools in which the handle portions fold into a sheathing position to protect the blade when not in use.

I am aware of a number of prior art tool devices in which handle elements have receiving slots or spaces for encasing a portion of the blade edge and, being pivotally swingable away from the blade edge to a rearward abutting position to form a handle element. Such tools have pivotal axes disposed transversely to the direction of pressure when the blade edge is utilized. The arrangement thus possesses an inherent weakness in that the blade is unstable and will not be rigidly held during the use thereof. Furthermore, where the handle halves are open throughout their width the blade will be exposed to atmosphere and moisture and dirt may enter into the handle when in sheathing position and cause the blade to become corroded and rusty. When the prior art sheathing handles become slightly worn the blade will become so loose as to project beyond the sheathing portion and the effectiveness thereof will be lost. My invention contemplates the provision of a sheathing handle comprising shell-like elements which are swingable in a plane lateral to that of the tool blade and which will form a sheathing structure which is rigid with respect to the handle and particularly in the direction of pressure to be exerted on the tool blade during use.

It is an object of the invention to provide a double-bladed tool having a medial flat and wide area to which laterally swingable handle halves are mounted so that the handle halves will form a combined sheath for one end and handle for the other, and may be reversely positioned to form a sheath for the opposite end of the blade.

It is a further object to provide a useful and simple tool in which the handle element comprises an alternatively used rigid and firm handle or a sheathing member for the said blade, the elements of the device being simply mounted yet having rigidity and positively safeguarding the tool element when not in use.

These and other objects and advantages of my invention will more fully appear from the following description made in connection with the accompanying drawings wherein like reference characters refer to similar parts throughout the several views and in which:

Fig. 1 is a perspective view of my invention wherein the blade element provides a double ended tool and the swingable handle halves are in intermediate open position;

Fig. 2 is a side elevation of the embodiment shown in Fig. 1, the handle halves being abutted in side-by-side relation to encase one portion of the tool blade and to furnish a handle for the other portion thereof, the cap member being shown in latched position on the handles;

Fig. 3 is a vertical section of the embodiment shown in Fig. 2 and taken on the line 3—3 thereof;

Fig. 4 is a horizontal segmental section taken on the line 4—4 of Fig. 2; and

Fig. 5 is a perspective view of the cap member which interfits with the handle halves to maintain them in abutting relation.

Referring now to the drawing,

Fig. 1, the embodiment there shown comprehends a blade 10a which terminates forwardly in a tool end 11b and rearwardly in another tool end 11a.

The ends 11a and 11b of blade 10a terminate in points 12a and 12b respectively. Tool end 11a is provided with a working edge such as serrated edge 13a while the tool end 11b may be provided with a cutting edge 13b. The two tool ends 11a and 11b join inwardly at a thin and wide portion 14 across which is hingedly secured a pair of handle halves or shells 15a and 16a. The hinge structure comprises a pair of tubular elements 17 and 18 which are axially aligned and secured in spaced relation to one side of the blade 10a. Another pair of spaced tubular members 19 and 20 are secured in opposed relation to one side of the blade 10a. Another pair of spaced tubular members 19 and 20 are secured in opposed relation to the opposite side of the blade as shown in Figure 4. The handle half 15a is provided with a corresponding hinge loop 21 which interfits between the tubular portion 17 and 18 in aligned relationship and is adapted to receive a pin 22 as shown in Figure 1. The handle half 16a is similarly provided with a hinge loop 23 which is adapted to be positioned in alignment between tubular members 19 and 20 and through which a pin 24 may extend as shown in Figure 4. The tubular elements 17, 18, 19 and 20 are preferably welded to the blade 10a at the position indicated so as to form a pair of axes in spaced parallel relation with the plane of the blade and with each other. The handle halves contain provision for forming a sheath when swung either rearwardly or forwardly since the blade has two working portions. Thus, handle halves 15a and 16a are respectively provided with peripheral margins 29a and 30a, the peripheral margins being raised at both sides of each of the handle halves as shown more clearly in Fig. 3. The double raised peripheral edges thus provide recessed areas 25a and 26a on the handle halves 15a and 16a respectively. Furthermore, they provide another opposed pair of recesses 36 and 37 in the respective handle halves 15a and 16a for encasing the blade end 11b when the peripheral margins are in abutting relation. The rigidity of the handle is maintained even though the handle halves be united at one side or the other. When handle halves 15a and 16a are swung outwardly and forwardly in abutting relation to sheath the blade 11a the recessed areas 25a and 26a will form a sheathing chamber. It is preferred that the peripheral marginal edges 29a and 30a be in intimate contact throughout their entire length so as to create a tight sheathing member and prevent the entrance of dirt and moisture. With the handle shell halves in abutting relation, a cap member 31 is placed over the ends thereof so as to maintain the halves in rigid abutting relation as set forth more clearly in Figure 2. The cap 31 is designed to closely interfit with the abutting ends and, further, has a latch 32 which may be formed as a rotatable T member having a shaft 33 extending through the end of the cap 31 and terminating inwardly in a cross bar 34 as shown in Figure 5. The outwardly extending end of shaft 33 may be provided with a milled nut 35 which will facilitate the rotation of the T bar 34 to engage the edges of the peripheral raised margins 29a and 30a when the handle halves 15 and 16 are in forward sheathing relation and to engage the edges of the small notches 38 when the handle halves 15 and 16 are swung rearwardly in abutting relation to form a firm handle for the tool and thereby prevent removal of cap 31 until such time as the latch member is again rotated through 90 degrees. The same cap member 31 may be employed to engage the ends of the handle halves whether they are in sheathing relation with blade 11b or with 11a. Notched areas 38 are formed in the raised peripheral edges 29a and 30a so as to permit entrance of the T bar 34 when in upright position as shown in Fig. 5. When the T bar is rotated to the position shown in Fig. 2, the remainder of the peripheral raised portions not cut away in the notches 38 will be engaged thereby so as to prevent accidental removal of the cap member 31.

The tool at all times presents a pleasing appearance while at the same time providing strength and rigidity to the tool and further providing a complete sheathing structure for the blade portion in question when the handle halves are swung in encasing relation therewith.

It may thus be seen that I have provided a useful and efficient tool having a handle comprised of laterally swinging shell-like halves, the tool having an ornamental appearance yet functioning to provide a rigid handle and a sheathing member which will adequately protect the blade portion of the tool which is not being used.

It will, of course, be understood that various changes may be made in the form, details, arrangement and proportions of the parts without departing from the scope of my invention.

What I claim is:

1. A tool comprising an elongated blade having a thin and wide portion intermediate the ends thereof, a hinge structure comprising two tubular elements rigidly disposed in opposed relation at each side of said thin and wide portion at substantially the center thereof, each having an axis disposed outwardly and transversely of the general plane of said blade, the respective axes lying in parallel relationship, a pair of handle halves each having a generally flat and elongated configuration hingedly secured at its inner end to said hinge structure, a raised peripheral margin formed about each of said handle halves, said margin extending uninterruptedly from the hinge structure along the sides and end of each handle half and off-set to both sides of the general plane thereof, to form a shell-like recess at each side thereof, each of the handle halves being swingable inwardly toward said blade and toward the other handle half with said peripheral margins continuously closed in abutting relation outwardly of the periphery of said blade whereby to encompass and sheath one end portion of said blade with respect to the hinge structures while exposing the other portion of said blade.

2. The subject matter set forth in claim 1, and latch means at the outer end of each of said handle halves for cooperatively securing the handle halves together in substantially sealed abutted relation to one side of the hinge structures and similarly for securing the handle halves together when swung to the other side of the hinge structures.

References Cited in the file of this patent

UNITED STATES PATENTS

| | | |
|---|---|---|
| 701,686 | Day | June 3, 1902 |
| 953,240 | Shuffelton | Mar. 29, 1910 |
| 1,274,288 | Larter | July 30, 1918 |

FOREIGN PATENTS

| | | |
|---|---|---|
| 4,209 | Great Britain | Sept. 29, 1881 |
| 9,408 | Great Britain | Apr. 23, 1898 |
| 155,928 | Germany | Oct. 26, 1902 |